United States Patent
Arnold et al.

(10) Patent No.: US 10,081,330 B2
(45) Date of Patent: Sep. 25, 2018

(54) SEAT BELT BUCKLE PRESENTER ASSEMBLY

(71) Applicant: Key Safety Systems, Inc., Sterling Heights, MI (US)

(72) Inventors: David R. Arnold, Macomb, MI (US); Rudi Grzic, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 14/650,624

(22) PCT Filed: Dec. 10, 2013

(86) PCT No.: PCT/US2013/073975
§ 371 (c)(1),
(2) Date: Jun. 9, 2015

(87) PCT Pub. No.: WO2014/093266
PCT Pub. Date: Jun. 19, 2014

(65) Prior Publication Data
US 2015/0307060 A1    Oct. 29, 2015

Related U.S. Application Data

(60) Provisional application No. 61/735,229, filed on Dec. 10, 2012.

(51) Int. Cl.
| | |
|---|---|
| *B60R 22/20* | (2006.01) |
| *B60R 22/06* | (2006.01) |
| *B60N 2/68* | (2006.01) |
| *B60R 22/03* | (2006.01) |
| *B60R 22/26* | (2006.01) |
| *B60R 22/18* | (2006.01) |

(52) U.S. Cl.
CPC .............. *B60R 22/06* (2013.01); *B60N 2/688* (2013.01); *B60R 22/03* (2013.01); *B60R 22/201* (2013.01); *B60R 22/203* (2013.01); *B60R 22/26* (2013.01); *B60R 2022/1806* (2013.01); *B60R 2022/207* (2013.01); *B60R 2022/208* (2013.01)

(58) Field of Classification Search
CPC ..... B60R 22/03; B60R 22/203; B60R 22/202; B60R 22/201; B60R 22/20; B60R 22/06; B60R 2022/021; B60R 2022/207; B60R 2022/208; B60R 2022/1806; B60N 2/688
USPC .............................. 280/801.2, 804; 297/473
See application file for complete search history.

(56) References Cited

U.S. PATENT DOCUMENTS

| | | | |
|---|---|---|---|
| 6,279,954 B1 * | 8/2001 | Townsend | B60R 22/03 280/801.1 |
| 2002/0167212 A1 * | 11/2002 | Rogers, Jr. | B60R 22/03 297/468 |

FOREIGN PATENT DOCUMENTS

| | | |
|---|---|---|
| DE | 102011011780 A1 | 8/2012 |
| JP | H07309206 A | 11/1995 |

(Continued)

*Primary Examiner* — Keith J Frisby
(74) *Attorney, Agent, or Firm* — Markell Seitzman

(57) ABSTRACT

A seat belt buckle presenter assembly (10) has a guide track (40) and a buckle presenter assembly (20). The guide track (40) is anchored to a vehicle seat frame at a first end and a second end. The buckle presenter assembly (10) is secured to and mounted onto the guide track (40) and is movable along the guide track (40) from a stowed position at the first end to an extended position toward the second end. Preferably, the guide track (40) is inclined having the first end of the guide track (40) fixed lower than the second end.

10 Claims, 11 Drawing Sheets

(56) References Cited

FOREIGN PATENT DOCUMENTS

| | | | |
|---|---|---|---|
| JP | H08183426 A | 7/1996 | |
| JP | WO-2004041602 A1 * | 5/2004 | ......... B60R 22/1952 |
| JP | 2009090957 A | 4/2009 | |
| JP | 2010-023688 A * | 2/2010 | |
| JP | 2010023688 A | 2/2010 | |
| KR | 20100114585 A * | 10/2010 | |
| WO | WO 0063050 A1 * | 10/2000 | ............. B60R 22/03 |

* cited by examiner

SEAT BELT BUCKLE PRESENTER ASSEMBLY

FIELD OF THE INVENTION

The present invention relates to seat belt restraints generally, and more particularly to a seat belt buckle presenter assembly.

BACKGROUND OF THE INVENTION

It is known to provide a seat belt restraint system in a vehicle to restrain an occupant in a seat of the vehicle. In most vehicles, the seat belt restraint system may be formed with a lap belt and a shoulder belt. Typically, the lap belt and shoulder belt are made from one continuous length of belt webbing and have a tongue or latch plate for insertion into a buckle. The tongue can be and often is slidably affixed on this belt webbing. When the buckle and tongue are buckled together, the seat belt restraint system restrains movement of the occupant to help protect the occupant during a collision.

Typically, the webbing or anchor cable for the buckle of the seat restraint system is fixed to the seat or vehicle structure. In addition, the buckle is most usually located in an inconvenient position toward a rear of the seat cushion, consequently, an occupant of the seat must hunt for the buckle to latch the tongue with the buckle. It is desirable to have a system which allows the occupant to easily locate the buckle for a seat restraint system.

To facilitate connecting or latching the tongue to the buckle several devices have been developed. These devices are often referred to as buckle presenter assemblies.

In some of the prior art most buckle presenters rely on a pivotable rotation of the buckle from a stowed position near seat level to a projecting level above the seat. These systems provide little assistance in latching the tongue to the buckle because the occupant's body still blocks the view during the latching.

In U.S. Pat. No. 6,550,867 an assembly with a gear nut and a jackscrew provides longitudinal movement of the buckle between a forward position and a rearward position. In this assembly, the buckle presenter is more readily accessible. The assembly is fixedly fastened to a seat track of the seat.

Similarly, U.S. Pat. No. 8,157,292 uses a rotating screw to move the buckle longitudinally, but further incorporates a pivoting buckle head to facilitate coupling and uncoupling the tongue and buckle.

In these devices when the seat belt is severely loaded, the rotating screw sees a large potentially damaging load or force. This can be problematic and cause an issue with the restraint.

It is therefore an object of the present invention to provide a buckle presenter assembly that isolates and protects the screw drive elements and reliably locks the buckle in its position when under severe loads. It is a further object of the invention to provide a very compact buckle presenter assembly to minimize the space required to employ the device.

These and other objects are met by the invention as described herein.

SUMMARY OF THE INVENTION

A seat belt buckle presenter assembly has a guide track and a buckle presenter assembly. The guide track is anchored to a vehicle seat frame at a first end and a second end. The buckle presenter assembly is secured to and mounted onto the guide track and is movable along the guide track from a stowed position at the first end to an extended position toward the second end. Preferably, the guide track is inclined having the first end of the guide track fixed lower than the second end.

In a first embodiment, the assembly has a lead screw; the lead screw is affixed to the guide track at the first and second end and is suspended from the guide track. The buckle presenter assembly has a frame structure adapted to fit over the guide track and a worm gear held in the frame structure and driven by the rotation of the lead screw. The seat belt buckle presenter assembly further has a motor coupled to the lead screw to provide rotation of the lead screw and a frame structure which includes a locking mechanism. The locking mechanism has a slot through which the guide track extends allowing the frame structure to move along the guide track.

In some alternative embodiments, the linear guide track has a plurality of gear teeth and the buckle presenter assembly has a frame structure adapted to fit over the guide track. The frame structure holds a rotatable worm gear engaging the gear teeth of the guide track to drive the buckle presenter assembly linearly along the guide track between the stowed position and extended positions. The buckle presenter assembly further has a drive motor mounted on the frame and connected to the worm gear; the drive motor rotates the worm gear to drive the assembly along the guide track.

In each embodiment, the locking mechanism is held in an unlocked position during normal use. The locking mechanism locks on the guide track when a seat belt buckle affixed to the presenter assembly is urged upward or forward by a load typically applied by interaction with the occupant. The locking member tilts into a locked position. In one embodiment, the locking position is achieved with the locking member lockingly engaging an upper surface of the guide track.

In an alternative embodiment, the locking position is achieved with the locking member lockingly engaging a bottom surface of the guide track. In each embodiment, the guide track preferably has a smooth hardened surface on one or both of the upper or bottom surface of the guide track into which the locking member engages to lock the presenter assembly.

The locking member is biased to an always open unlocked condition by a spring held in the frame of the presenter assembly. The first end of the guide track is anchored and pivotable about a bolt secured to a seat frame and the second end has a front anchor with a slot for receiving the guide track. The front anchor is secured to a seat frame.

In the most compact embodiments, the presenter assembly has the worm gear above the guide track to engage the gear teeth which are positioned on an upper surface of the guide track or alternatively has the worm gear below the guide track to engage the gear teeth which are positioned on a bottom surface of the guide track.

BRIEF DESCRIPTION OF THE DRAWINGS

The invention will be described by way of example and with reference to the accompanying drawings in which.

DETAILED DESCRIPTION OF THE INVENTION

Figure 1:
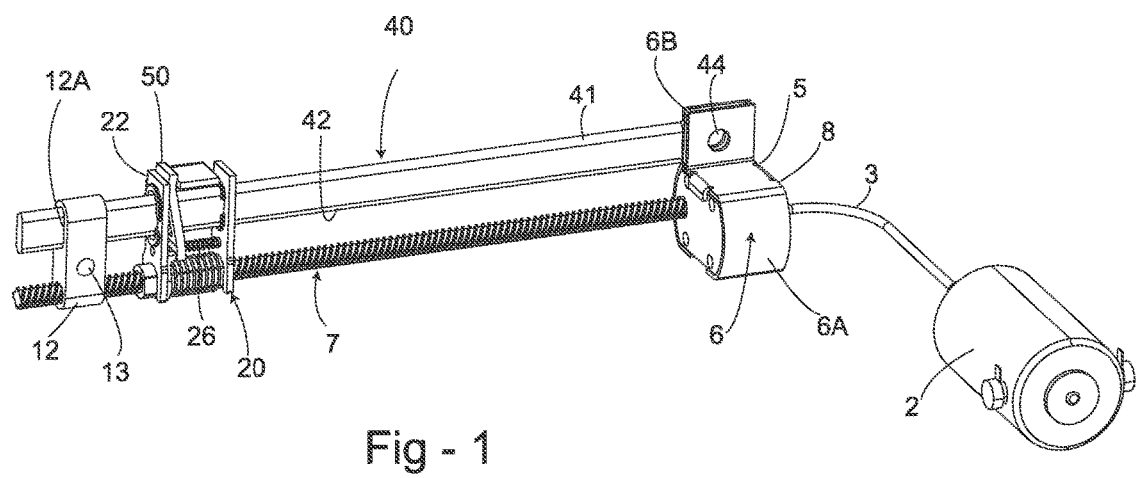
FIG. 1 is a perspective view of the seat belt buckle presenter of a first embodiment of the invention.
Figure 1A:
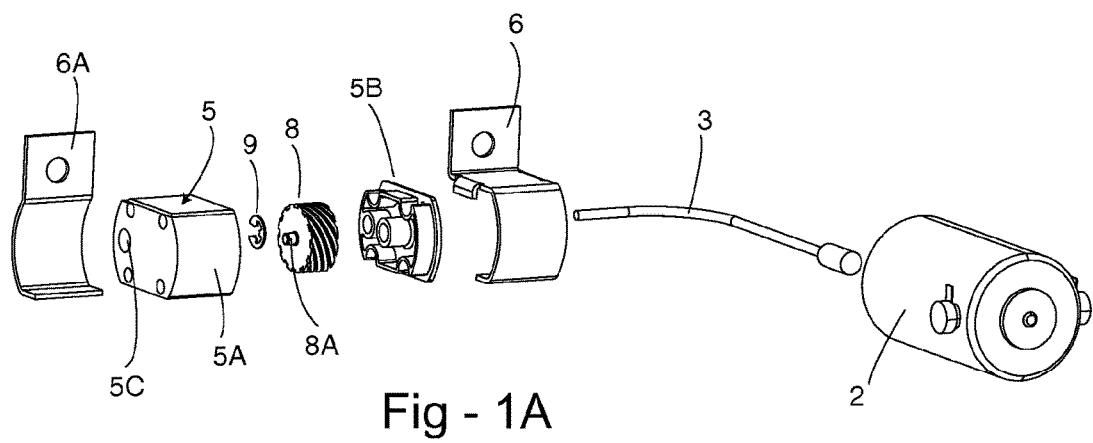
FIG. 1A is a partial exploded view of the mechanism of FIG. 1.

With reference to the figures; in FIGS. 1 through 4, a first embodiment of the invention is illustrated. This first embodiment employs a lead screw 7 that is motor driven to move the presenter assembly 20 which includes frame structure 22 longitudinally along the guide track 40. In FIGS. 5 through 8, a second alternative embodiment of the invention is shown and in FIGS. 9 through 10, a third alternative embodiment is shown. Both the second and third embodiments employ a frame structure 22 holding a motor 2 driven worm gear 8 and motor that drives the presenter assembly 20 along gear teeth 43 cut into the guide track 40. These alternative embodiments eliminate the suspended lead screw 7 and are more compact devices. All the embodiments employ a unique, normally open locking mechanism 50 that protects the drive screws or gears and motor 2 from excessive loads. Where common elements are used in each of these embodiments, common reference numerals are used.

Figure 1B:
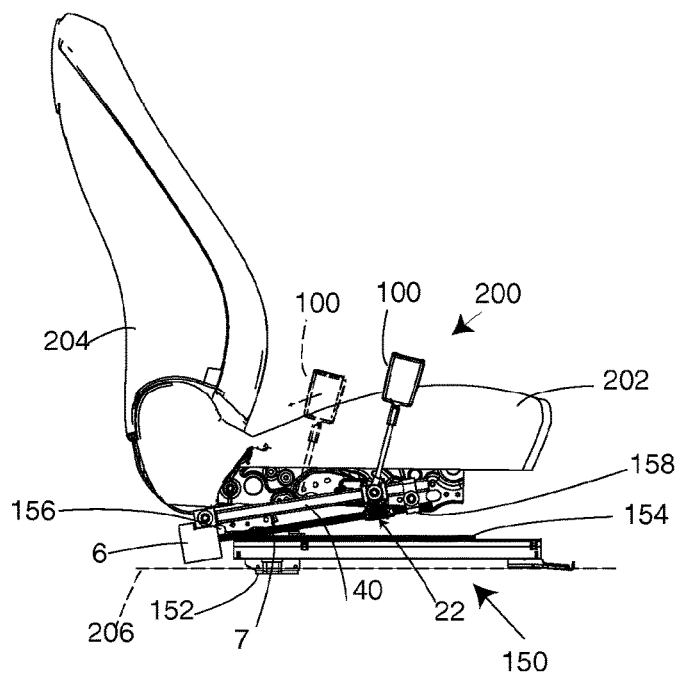
FIG. 1B illustrates an exemplary connection of a seat belt buckle presenter to a seat frame.
Figure 5:
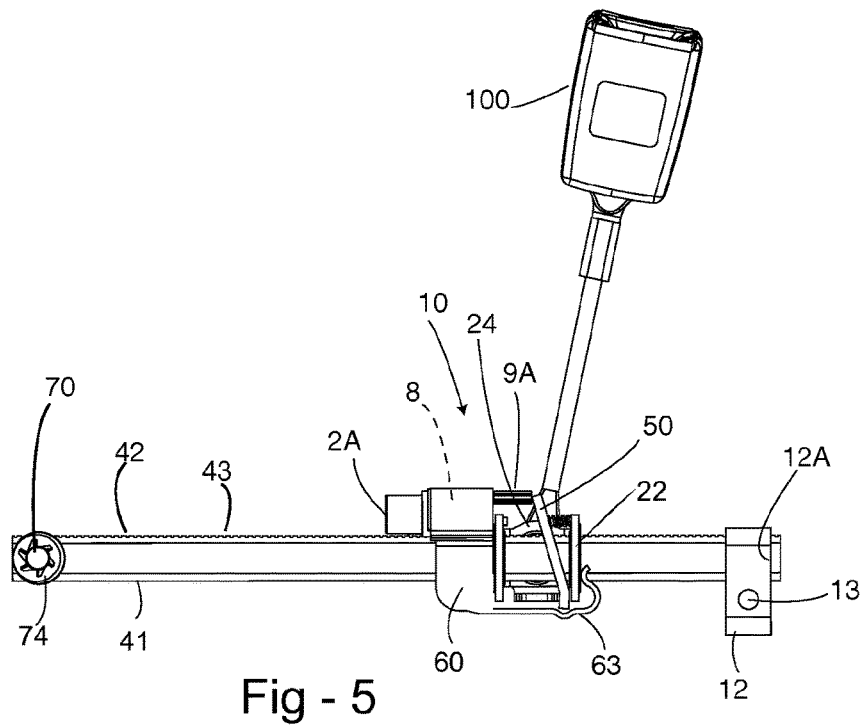
FIG. 5 is a perspective view of a second embodiment seat belt buckle presenter assembly of the present invention.
Figure 5A:
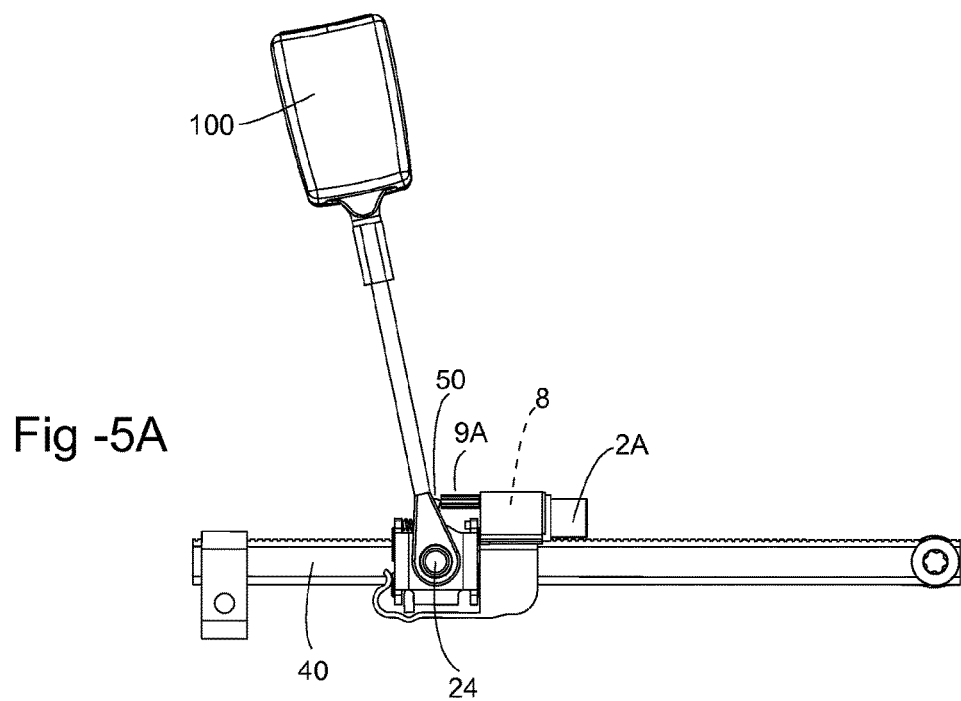
FIG. 5A is a reverse view of the buckle presenter assembly in FIG. 5.

With reference to FIG. 1, the seat belt presenter assembly (also referred to as the seat belt presenter) 10 of the first embodiment is illustrated. The seat belt buckle presenter 10 is shown having a guide track 40. The guide track 40 provides a path or rail upon which a presenter assembly 20 can traverse longitudinally from a first end position or stowed position to a second extended position. The track 40 as shown has an upper surface 41 and lower surface 42. The presenter assembly 20 rides on these surfaces. The track 40 at a first end has an opening 44 through which a bolt can be used to anchor this assembly to a seat frame, shown in FIG. 1. FIG. 16 shows an exemplary connection of a track 40 to a seat frame which is positioned below a seat 200 having a cushion 202 and a seat back 204. More particularly, FIG. 1B shows a seat frame 150 having a seat frame lower portion 152 adapted to be connected to the vehicle floor 206. The seat frame includes a seat frame intermediate portion 154 adapted to move up and down and fore and aft relative to the lower portion 152. The mechanism to move the intermediate portion is known in the art and not shown. The intermediate portion 154 includes a hinge portion 156 to which a seat frame cushion portion 158 is connected. The cushion portion is free to rotate about the hinge portion 154 by appropriate mechanisms also known in the art and not shown. The anchor assembly 12 connects one end of the guide track 40 to the cushion portion 158 of the frame and another end of the guide track is connected via the gear box 6 to the hinge portion of the frame 156. In FIGS. 5 and 5A and other embodiments, it is the fastener 70 that is connected to the hinge portion and the anchor assembly 12 continues to be connected to the cushion portion as before. In FIG. 1B, the buckle 100 is shown in a forward, presented position. The buckle 100 is also shown in a mid-position (see phantom lines), the dashed arrow line is representative of the movement of the presenter 10 along track 40. In the stowed position up to the mid location, the buckle 100 is at least partially below the seat cushion as shown in FIG. 1B. The buckle is movable to a rear position then the belt is tightened about the occupant. The initial angular position of the track relative to horizontal and to the frame cushion portion 158 and the initial angular position of the buckle 100 relative to horizontal and to the track will vary with each seating system. Surrounding this opening 44 is the bracket 6 as illustrated. This bracket which can be made in two pieces 6A and 6B surrounds a gear housing 5 (see FIG. 3) which is formed of portions 5A and 5B and which holds a worm gear 8 which is connected to a motor 2 through a flexible drive shaft 3 as shown in FIG. 1. At an opposite end, an anchor assembly 12 is illustrated. The screw gear 7 is received in the housing 5 through opening 5C. The anchor assembly 12 has a through hole 13 through which the second end can be secured to a seat frame. The presenter assembly 20 slides upon the track 40 and is driven by lead screw 7 having threads 11.

Figure 3:
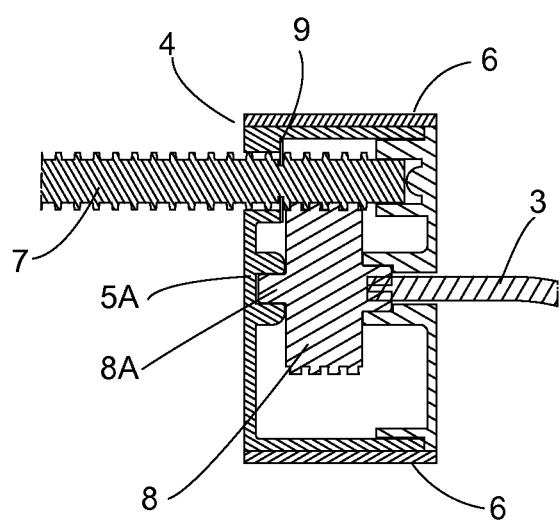
FIG. 3 is a top plan view of the side view of the drive gear box of the assembly located at a first end of the device.

With reference to FIG. 3, the drive gear box assembly 4 is shown. The drive gear box assembly 4 is surrounded by the bracket 6. In FIG. 3, this is a top view looking down showing the lead screw 7 extending into the gear housing 5 as illustrated. This lead screw 7 is retained in position with a retainer clip 9. As shown, the retainer clip 9 is an e-clip that surrounds the threads 11 and locks the lead screw 7 into position. Below the lead screw 7 is a worm gear 8. The worm gear 8 engages the threads 11 of the lead screw 7. The worm gear 8 is connected directly to the flexible drive shaft 3 which is driven by the motor 2. The worm gear 8 upon rotation will rotate the lead screw 7. As shown, the worm gear 8 is suspended in the gear housing 5 on an stub axle 8A, which is part of the worm gear 8 and which fits into appropriate openings 5C in the housing 5 which form a bushing and housing cover 5B and therefore can rotate, one being driven by the drive shaft 3. These elemental features are best shown in FIG. 4, an exploded view of the entire assembly 10.

Figure 2:
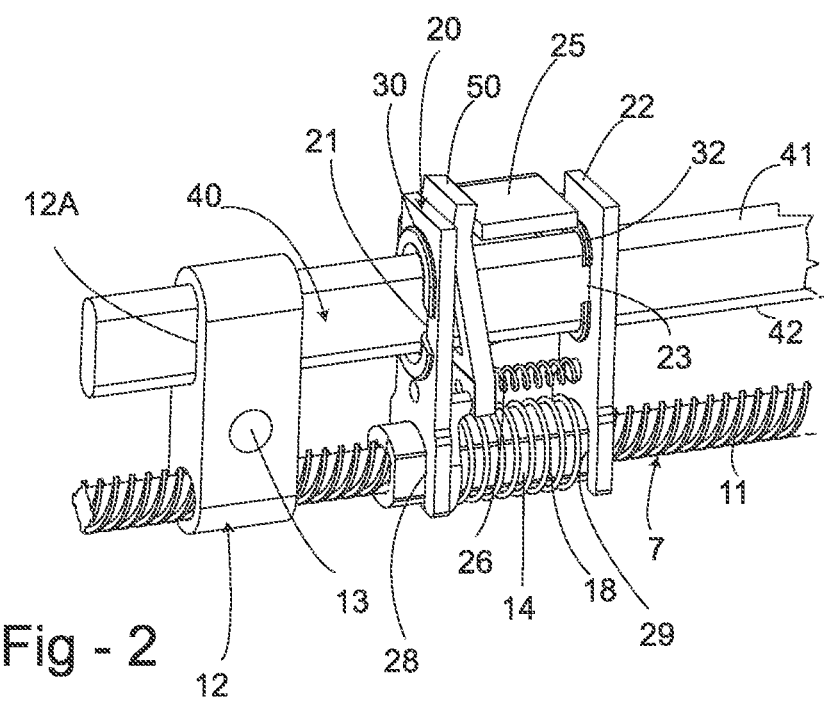
FIG. 2 is an enlarged perspective view of the frame structure of the seat belt buckle assembly with a locking mechanism shown near a second end of the assembly taken from FIG. 1.
Figure 7:
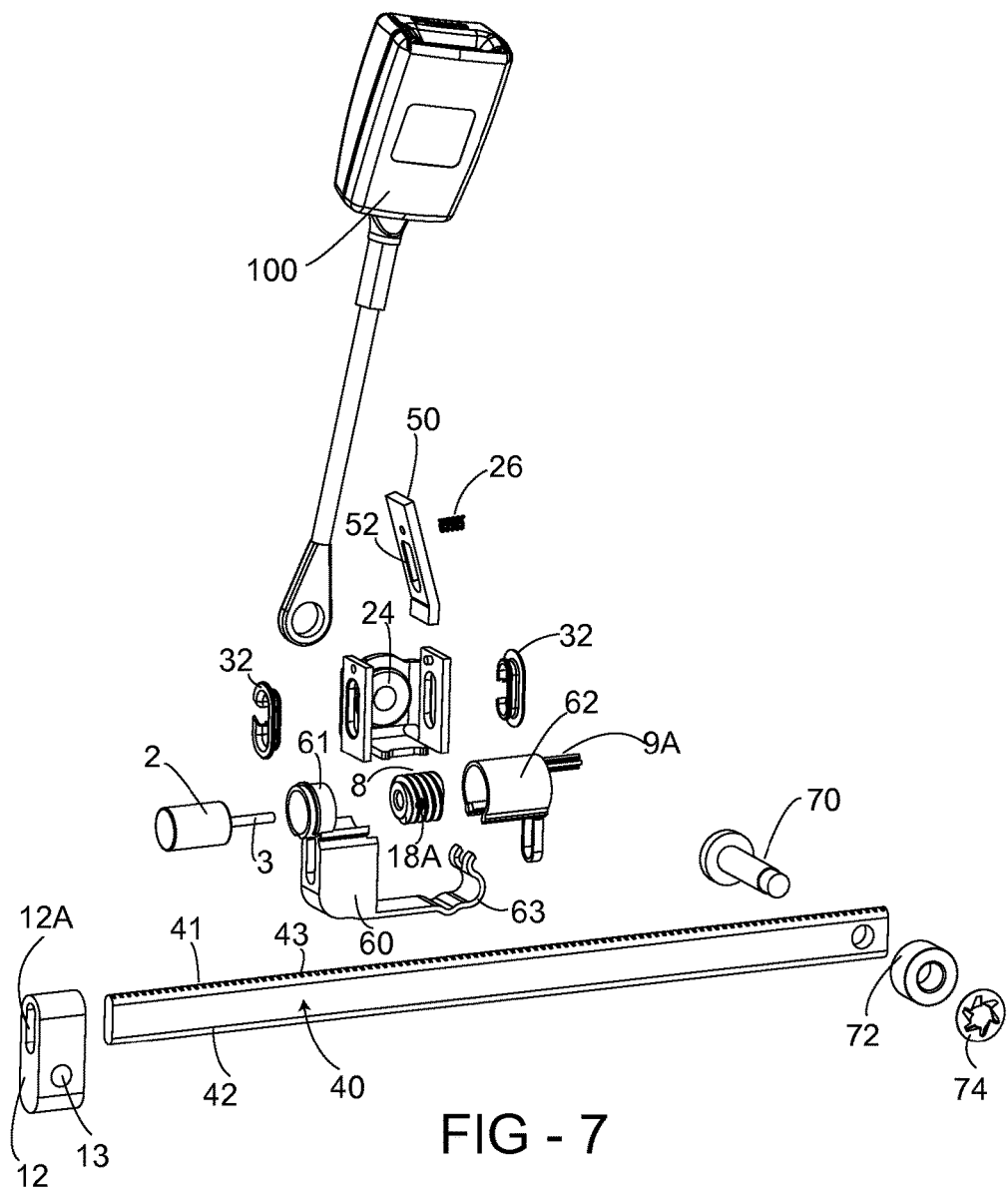
FIG. 7 is an exploded view of the second embodiment assembly taken from FIG. 5.
Figure 10:
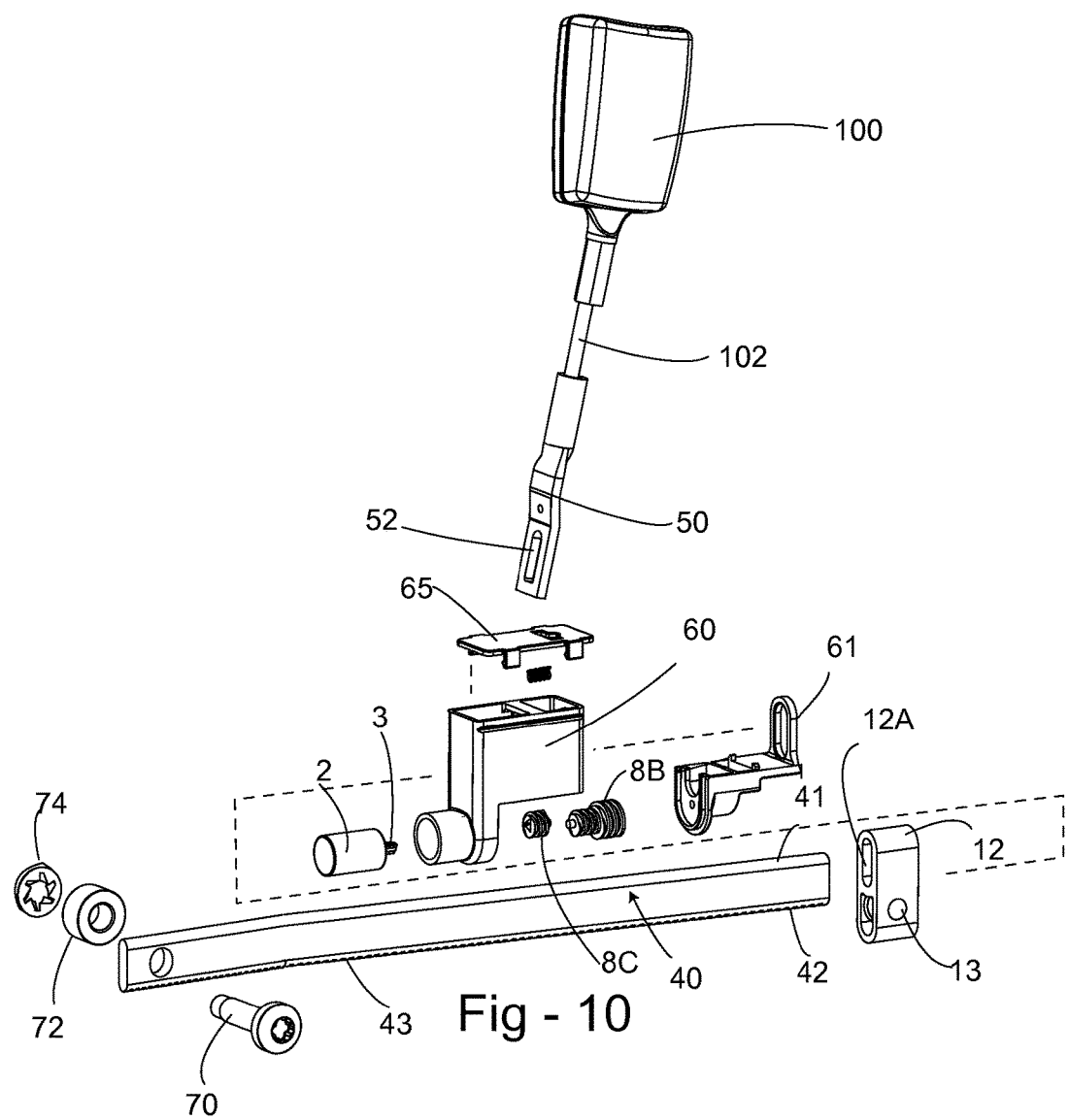
FIG. 10 is an exploded view of the third embodiment of FIG. 8 showing the elements of the invention.

An enlarged view of the presenter assembly 20 is shown in FIG. 2. The frame structure 22 has guide slots 21 and 23. These guide slots 21, 23 receive the guide track 40 and allow it to pass through to facilitate smooth sliding of the presenter assembly 20. Guide sleeves 30, 32 are provided; these guide sleeves 30 and 32 are preferably made of a plastic or elastomeric material that provides a smooth low friction surface to facilitate the movement of the presenter assembly 20 along the guide track 40. As shown, these guide sleeves 30, 32 are formed having a "C" like appearance with an opening such that they can be flexed into position and mounted into the slots 21, 23 of the frame structure 22. The frame 22 as illustrated has an upper flange 25 that is bent over and an anchor nut 24 extends from a side of the frame 22 as shown in FIGS. 5 and 7. This anchor nut 24 will accept a threaded fastener to bolt a cable or strap to which the seat belt buckle is attached in the manner as shown in FIG. 10.

Figure 4:
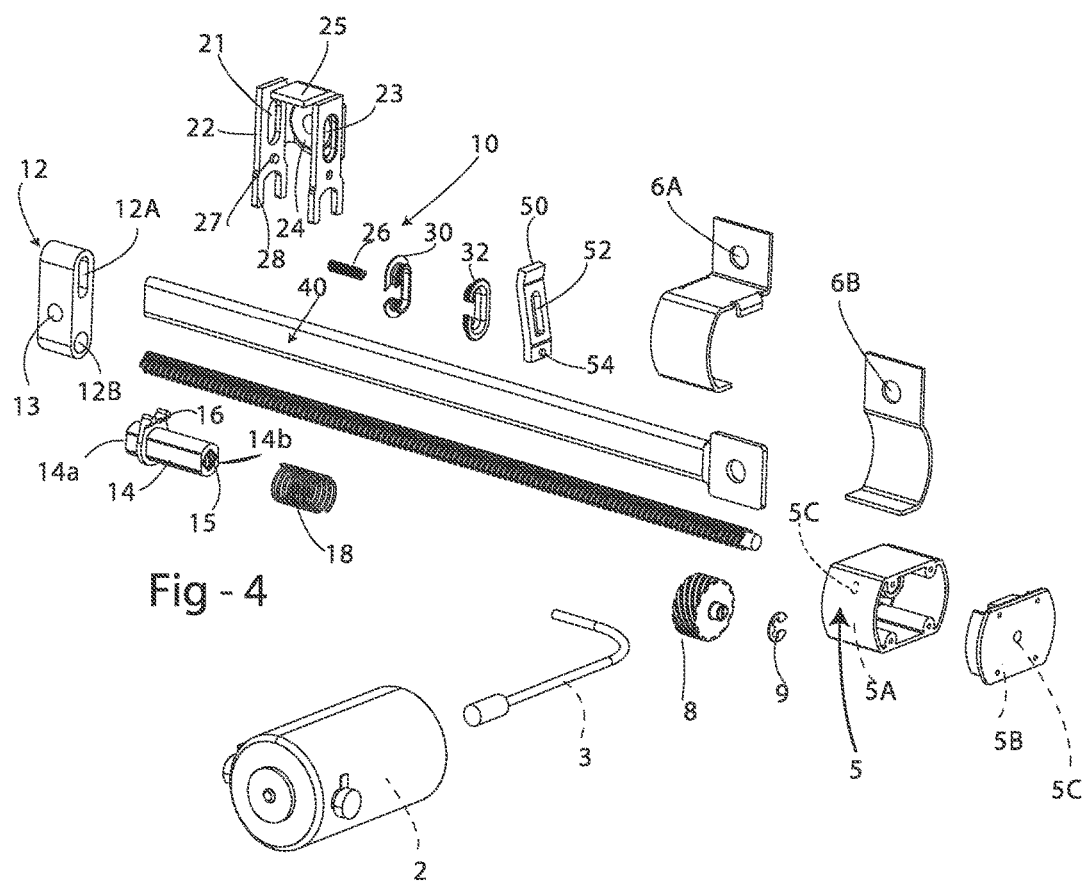
FIG. 4 is an exploded view of the assembly of FIG. 1 illustrating the various components.

With further reference to FIGS. 2 and 4, a locking lever mechanism 50 is shown. The locking mechanism 50, which is similar to a mechanism shown in U.S. Pat. No. 7,182,390 which is incorporated herein by reference, is a slotted rigid member preferably made of steel. The locking mechanism 50 has a slot 52 which is adapted to fit about the guide track 40. A small projection 54 extends from the lower portion of the locking lever mechanism 50 and a spring 26 is provided that fits over the projection 54 and is also positioned over an oppositely positioned projection 27 (also see FIG. 4) of the frame 22 thereby holding the spring 26 between one end of the frame 22 and the locking lever mechanism 50. The spring 26 biases the locking lever mechanism 50 into a normally open or unlocked position when mounted on the guide track 40 as shown in FIG. 2. This normally open position enables the presenter assembly 20 to slide freely up along the track 40 as the lead screw 7 is rotated by the motor 2. With further reference to FIG. 2, mounted over the lead screw 7 is a drive nut 14; the drive nut 14 has internal threads 15 which engage the threads 11 of the lead screw 7. These threads 15 shown in FIG. 4, when engaging the lead screw 7 are such that as the lead screw 7 rotates, the drive nut 14 will move up and down the lead screw 7 dependent on its direction of rotation. The frame 22 as shown fits over the drive nut 14 in two locations. The frame structure 22 has slotted openings 28 and 29 cut in the frame 22 that fit over the drive nut 14. The drive nut 14 has flat surfaces 14a, 14b on each side complementary to the sides of the openings 28, 29 such that the drive nut 14 will not rotate when the frame structure 22 is positioned over it. Prior to mounting the frame structure 22 over the drive nut 14 a spring 18 is positioned over the drive nut 14 and in between the frame assembly 22. This spring 18 presses up against the flange 16 of the drive nut 14 and one end of the frame structure 22. The flange 16 of the drive nut 14 has a slot at an upper surface that is adapted to fit over another projection 27 on the frame assembly 22. This helps secure the frame 22 and the drive nut 14 into proper alignment on the track 40 to prevent the frame assembly 22 from binding as the lead screw rotates. This keeps a proper alignment of the entire presenter assembly 20 so that it can freely slide up and down the guide track 40.

At the second end of track 40, the second anchor bracket 12 is again illustrated; this bracket can be made of a rigid plastic or metal material and it has a vertical opening 12A for the guide track 40 to fit through and a lower opening 12B for the screw 7 to pass. This helps align and position the guide track 40 relative to the screw 7. As mentioned, a hole 13 is provided to which a bolt or anchor fastener can be used to secure this bracket 12 to a seat frame (not illustrated). Once this fastening is completed, both ends of the seat belt buckle presenter assembly 10 are locked onto a seat frame. Power is provided to the DC motor 2 assembly through an electrical connection and wiring (not illustrated).

During normal use, the seat belt buckle presenter 10 will have the presenter assembly 20 positioned near or at the first stowed end, at a null position. Preferably the first end is a lower position relative to the seat and inclines slightly upwardly as it approaches the second extended or buckle coupling end. When an occupant is sitting in the seat and the seat belt is unbuckled, the presenter assembly 20 will be moved to the forward extended position from the lower stowed position. In the stowed position up to the mid location, the buckle 100 is at least partially below the seat cushion as shown in FIG. 1B. As the seat buckle presenter assembly 20 moves forward, the buckle assembly which is connected at the buckle anchor 24 will move to the inclined upward extended position longitudinally forward allowing the occupant to easily access the extended buckle 100 which, as shown in FIG. 1B, is partially above the seat cushion 202. This buckle 100 and buckle cable 102 is best shown in the second embodiment in FIG. 8.

In a severe crash or sudden movement where an occupant is thrust forward in a seat as would occur in a crash situation, the locking lever mechanism 50 which is biased in the normal or always open position by the spring 26 is pulled as the buckle 100 is loaded by the occupant's weight being thrust forward as this buckle 100 is being pulled; the locking lever mechanism 50 will rotate or tilt engage preferably along the upper 41 or lower 42 surfaces of the track 40. Preferably these surfaces 41, 42 are hardened steel and are such that as the locking lever mechanism 50 drives into the track 40 under these loads, it lockingly engages the guide track 40 preventing the presenter 20 and hence the buckle 100 from sliding forward and preventing the presenter assembly 20 from severely loading the lead screw 7 and drive nut 14 of the device. This prevents the motor 2 and any of the other associated components with moving the mechanism from being loaded severely as all the loads are taken by the guide track 40 and locking lever mechanism 50. The guide track 40 being securely anchored to the seat frame then transmits the load directly to the seat frame. This advantageously provides tremendous protection for the working mechanisms to prevent them from being damaged under loading conditions. This ensures that the life of the seat belt buckle presenter assembly 10 can be extended without concern for warping or bending of any of the threaded screws and prevents any internal damage to any of the other mechanisms associated with this device. Typically, locking mechanisms are in the always locked position. Examples of these are commonly found on such devices as wood working clamps. The locking levers must be moved into an open position in order to freely slide the clamp. In the present invention, the locking lever is biased so it is always open and never in a locked position during normal use. However, when under load it is forced into a locked position by a transfer of the load into the mechanism 50 which forces the spring 26 to compress and the locking lever mechanism 50 to engage the guide track 40. Once this occurs, the locking lever mechanism 50 will ensure all the loads are transmitted directly to the guide track 40 as previously discussed.

In this embodiment shown in FIG. 1, the motor 2 is a separate element connected to the assembly 20 through the drive shaft 3, therefore, the motor 2 can be positioned under the seat and does not occupy the space between adjacent seats and provides for a relative compact assembly.

Figure 6B:
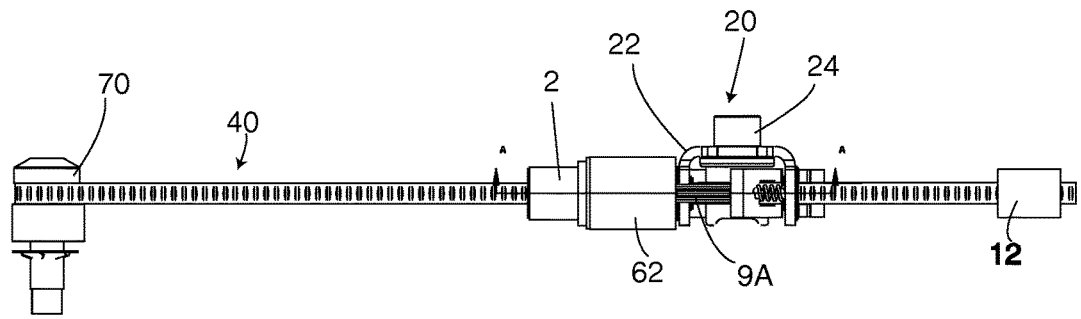
FIG. 6B is a top view of the buckle presenter in FIGS. 5 and 6.
Figure 6A:
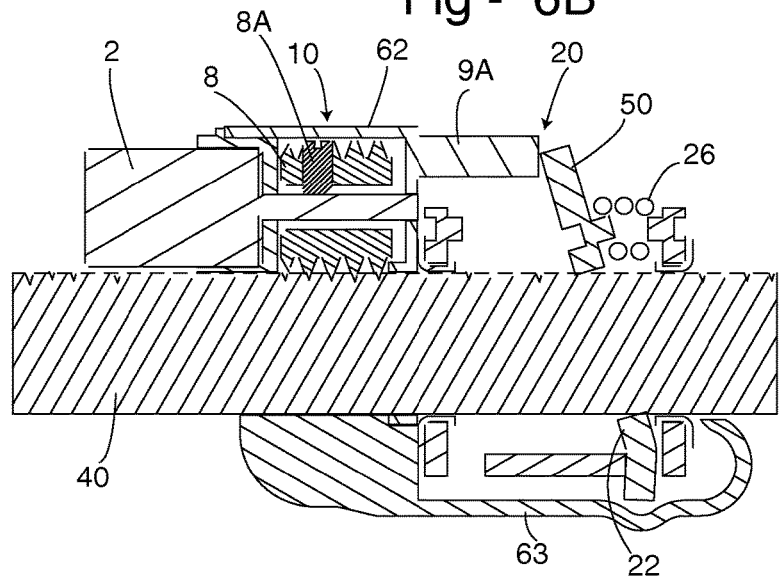
FIG. 6A is a cross-sectional view of the buckle presenter of FIG. 6.
Figure 6:
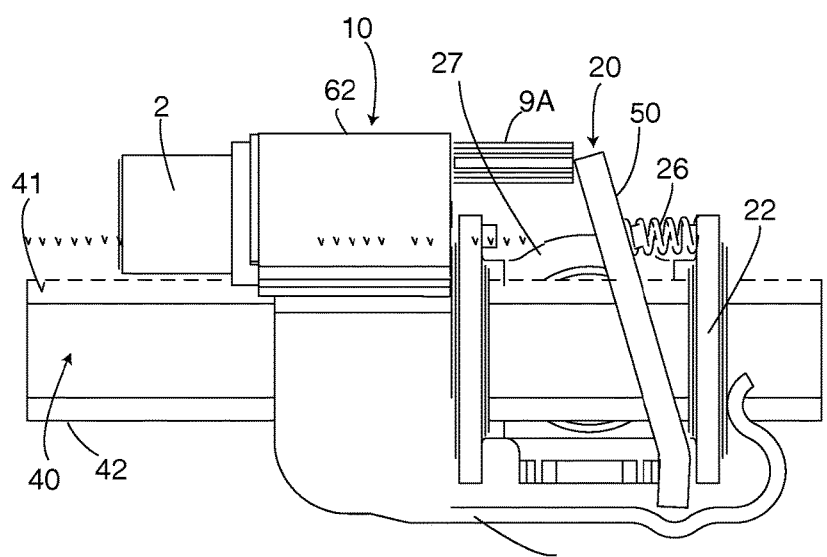
FIG. 6 is a plan view of the seat belt buckle presenter of FIG. 5.

With reference to FIGS. 5 through 7, a second embodiment is illustrated, this second embodiment seat belt buckle presenter assembly 10 has the lead screw deleted and removed. In this assembly, a small motor 2 is mounted directly onto the presenter assembly 20. This second embodiment assembly 10 is very compact, by eliminating the lead screw and the separate motor; the entire presenter assembly 20 can traverse along the guide track 40 as illustrated. Uniquely, the upper surface 42 of the guide track 40 is shown with gear teeth 43; these gear teeth 43 are positioned to allow a worm gear 8 contained upon the presenter assembly 20 to rotate when driven by the motor 2. This rotation of the worm gear 8 engaging the gear teeth 43 allows the entire assembly to traverse longitudinally from the first stowed position to the extended second coupling position. This entire assembly 10 is similarly anchored to a seat frame at a first end anchoring location using the anchoring bolt 70. The second end uses bracket 12 as previously discussed, only this bracket 12 has an opening 13 to secure to the frame, but only a single slotted opening 12A to receive the track 40. When secured to the frame, both ends are tightly secured similar to the embodiment shown in FIG. 1 only in a much more compact size thus eliminating several components. As shown in FIG. 6, an end pin or projection 9A extends from a portion of the worm gear housing 60. This projection 9A presses against the locking lever mechanism 50. This locking lever mechanism 50 as illustrated has a slot 52 similar to the first embodiment and is held in an open position by the projection 9A and the spring 26 as shown. When the presenter assembly 20 is loaded by the buckle 100 at its attachment or anchor 24 location, this causes the frame to be pulled upwardly from the bottom causing the lower portion of the guide track 40 to be engaged by a sharp edge of slot 52 of the locking lever mechanism 50, thus locking the presenter assembly 20 into position.

With reference to FIG. 7, the various components of the assembly are illustrated in an exploded view. The presenter frame 22 is shown having the buckle anchor 24 shown positioned on the outside of the frame 22. When assembled, this anchor 24 is positioned internally of the frame 22 as best illustrated in FIG. 6. Again, guide sleeves 30, 32 are provided that allow the frame 22 to slide freely over the guide track 40. The locking lever mechanism 50 and spring 26 are further illustrated forming part of the presenter assembly 20. Additionally, a housing 60 is provided which supports the motor 2, a spacer 61 and a worm gear 8. The motor 2 has a shaft 3 which is connected directly to the worm gear 8. A housing cover 62 is provided that fits onto the housing 60 enabling the worm gear 8 and motor 2 assembly to be securely mounted in the cover 62 and housing 60. The projecting pin 9A is shown in FIG. 6 extending from this cover 62. A set screw 18A, as shown in FIGS. 6 and 7, can be provided which then engages a thread of the worm gear 8. This secures and locks the worm gear 8 into position so it does not move longitudinally; however, it is rigidly retained in the housing 60 and cover 62 assembly along with the motor 2. The housing 60 extends longitudinally with a spring clip structure 63 that can grasp the frame 22 when mounted. This grasping is facilitated as the end of structure 63 is bifurcated. In this condition, the guide sleeves 30, 32 then locate the frame 22 onto the guide track 40 and the spring clip 63 helps secure the frame 22 relative to the motor housing 60 ensuring that the entire assembly stays together as it traverses up and down the track 40. As shown, at the first end of the track, the opening 44 allows a bolt 70 with a spacer 72 and a bolt retainer 74 to be slipped through the opening 44 of the guide track 40; this bolt 70 can be passed through the frame of the seat through an opening therein and anchors the buckle presenter assembly 10 to the seat frame. The opposite end, the front anchor 12 similarly can be bolted to the frame of the seat, thereby securing the assembly 10 directly to the seat. In this embodiment, when the seat belt buckle is pulled, the locking lever mechanism 50 as previously discussed will move engaging the lower surface 42 of the guide track 40 locking the entire assembly into position so it cannot move fore or aft along the track 40.

Figure 8:
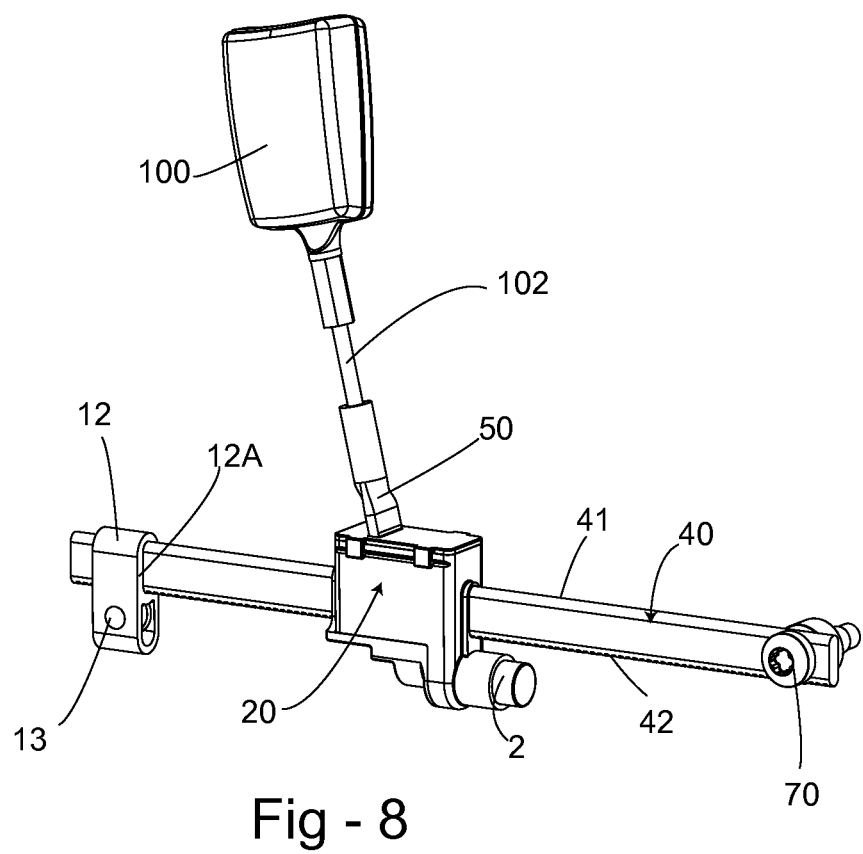
FIG. 8 is a perspective view of a third embodiment seat belt buckle presenter assembly according to the present invention.
Figure 9:
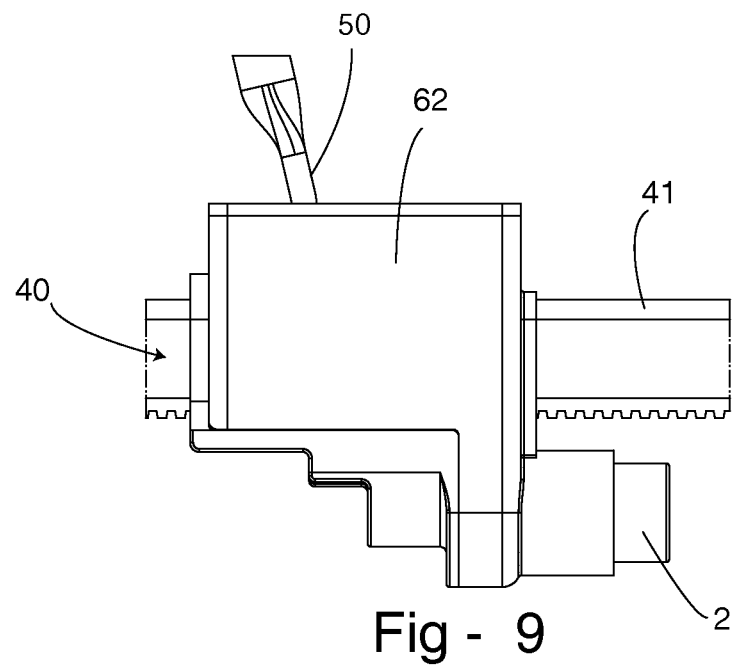
FIG. 9 is a plan view of the seat belt buckle presenter assembly of the third embodiment taken from FIG. 8.
Figure 9A:
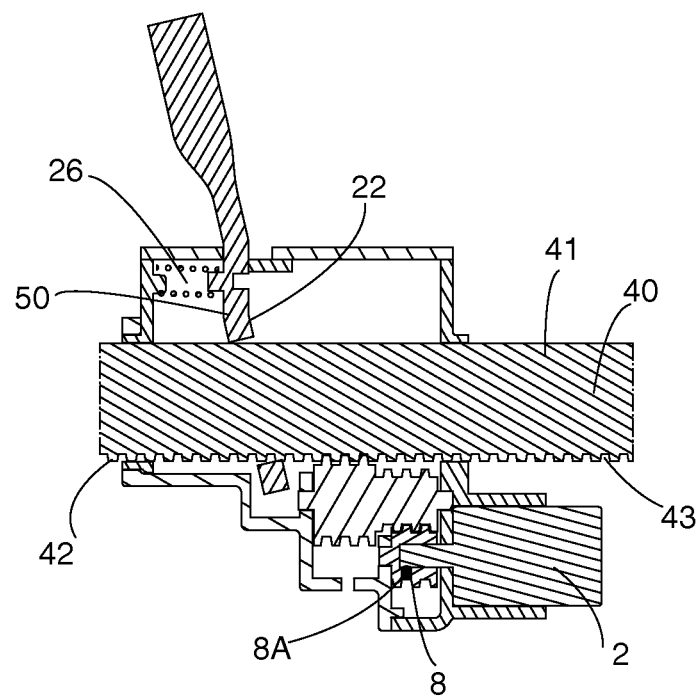
FIG. 9A is a cross-sectional view of the buckle presenter assembly of FIG. 9.

Reference is now made to FIGS. 8, 9 and 10 in which the third embodiment of the invention is illustrated. In this embodiment, the buckle 100 is illustrated with a cable 102 extending that is directly connected to the locking lever mechanism 50. In this assembly 10, the motor 2 is positioned on a lower portion of the housing 60 below the guide track 40; this seat belt buckle presenter 10 has many of the components similarly discussed in the second embodiment, however, the entire assembly is shifted so that the worm gear 8 and the gear teeth 43 on the track 40 are now moved to the lower surface 42. As illustrated in FIG. 9, when the buckle is moved in a forward direction, the spring 26 will compress and the upper surface of the slot 52 of the locking lever mechanism 50 will engage an upper surface 41 as the entire lever mechanism 50 pivots; this ensures that the hardened surface 41 on the track 40 will provide a locking resistance to movement of the presenter assembly 20 and ensure that the presenter assembly 20 is locked into position preventing any load from occurring on the motor 2 and worm gear 8 and preventing any relative movement of the presenter assembly 20 relative to the track 40. This greatly secures and isolates the entire assembly 20 and prevents damage to the working mechanisms of the device 10. The track 40 as illustrated is substantially oval or rectangular in shape giving it a relatively high resistance to bending from any upward lifting load therefore by anchoring it securely to the seat frame; this structure is extremely strong and can absorb the loads presented by an occupant when a vehicle is in a crash situation. This is a tremendous advantage over the prior art devices which simply rely on the mechanism to support the occupant as opposed to having a rigid guide structure that can absorb the loads while isolating the motor 2 and gear mechanisms from any of the transmitted forces.

With reference to FIG. 10, an exploded view shows the various elements of the assembly 10. In this third embodiment, the frame 22 is surrounded by the housing 60 and cover 61; a top cover 65 is also shown. It is understood similar covers would be used on the first and second embodiments for cosmetic and aesthetic improvements in overall appearance. Also in this embodiment, the cable 102 is shown fixed directly to the locking lever or locking mechanism 50 as an alternative way to fasten the cable 102. FIG. 10 replaces the conventional worm gear 9 with a differential worm gear mechanism with gears 8B and 8C which can vary the gearing ratio and linear speed of the housing 60. The differential worm gear mechanism can be in a gear-up or gear-down configuration.

In each of the first, second and third embodiments, the stowed position can be an intermediate position located forward of a belt tightening position. This belt tightening position is located to the rear of this intermediate position and upon sensing a crash, the assembly 20 moves the buckle rearwardly tightening the seat belt in the event of a crash. This is accomplished by connecting the presenter assembly circuit to a crash sensor which when activated causes the buckle presenter assembly to move toward the belt tightening position.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A seat belt buckle presenter assembly (10) comprising:
a guide track (40), the guide track being anchored to a vehicle seat frame of a vehicle seat at first and second end, the vehicle seat having a seat cushion;
a buckle presenter assembly (20) secured to and mounted onto the guide track and movable along the guide track (40) from a stowed position at the first end to an extended position toward the second end;
wherein the guide track (40) is inclined having the first end of the guide track (40) fixed lower than the second end, the guide track and a buckle cooperate so when the buckle is at the second end of the guide track the buckle is positioned partially above a top of the seat cushion and when the buckle is between a mid location extending to the first end the buckle is positioned lower at least partially below the top of the seat cushion, and wherein the second end is attached to or received in a front anchor (12) with a slot (12A) for receiving the guide track, the front anchor (12) being secured to the seat frame.

2. The seat belt buckle presenter assembly (10) of claim 1 wherein the guide track (40) has a plurality of gear teeth (43); and the buckle presenter assembly (20) has a frame structure (22) adapted to fit over the guide track (40) and the frame structure (22) holds a rotatable worm gear (8) engaging the gear teeth (43) of the guide track (40) to drive the buckle presenter assembly (20) linearly along the guide track (40) between the stowed position and the extended position.

3. The seat belt buckle presenter assembly (10) of claim 2 wherein the buckle presenter (20) assembly further comprises a drive motor (2) mounted on the frame structure and connected to the worm gear (8), the drive motor (2) rotates the worm gear (8) to drive the buckle presenter assembly (20) along the guide track (40).

4. The seat belt buckle presenter assembly (10) of claim 3 wherein the buckle presenter assembly (20) has the worm gear (8) above the guide track (40) to engage the gear teeth (43) which are positioned on an upper surface (42) of the guide track (40).

5. The seat belt buckle presenter assembly (10) of claim 3 wherein the buckle presenter assembly (20) has the worm gear (8) below the guide track (40) to engage the gear teeth (43) which are positioned on a bottom surface (42) of the guide track (40).

6. The seat belt buckle presenter assembly (10) of claim 1 further comprises:
a lead screw (7), the lead screw affixed to the guide track (40) at the first and second ends and suspended from the guide track (40).

7. A seat belt buckle presenter assembly (10) comprising:
a guide track (40), the guide track being anchored to a vehicle seat frame at first and second ends;
a buckle presenter assembly (20) secured to and mounted onto the guide track and movable along the guide track (40) from a stowed position at the first end to an extended position toward the second end;
wherein the first end of the guide track (40) is anchored and pivotable about a bolt (70) secured to the seat frame, wherein the second end is attached to or received in a front anchor (12) with a slot (12A) for receiving the guide track, the front anchor (12) being secured to the seat frame.

8. A seat belt buckle presenter assembly (10) comprising:
a guide track (40), the guide track being anchored to a vehicle seat frame at first and second ends;
a buckle presenter assembly (20) secured to and mounted onto the guide track and movable along the guide track (40) from a stowed position at the first end to an extended position toward the second end, wherein a frame (22) includes a locking lever mechanism (50), the locking lever mechanism (50) having a slot (52) through which the guide track (40) extends allowing the frame (22) to move along the guide track (40).

9. A seat belt buckle presenter assembly (10) comprising:
a guide track (40), the guide track being anchored to a vehicle seat frame of a vehicle seat at first and second ends;
a buckle presenter assembly (20) secured to and mounted onto the guide track and movable along the guide track (40) from a stowed position at the first end to an extended position toward the second end;
a buckle extending from the buckle presenter assembly;
wherein the guide track (40) is inclined and the first end of the guide track (40) is fixed lower than the second end and wherein a height of the buckle relative to the vehicle seat frame varies with movement of the buckle presenter assembly (20), and wherein the second end is attached to or received in a front anchor (12) with a slotted opening (12A) for receiving the guide track, the front anchor (12) being secured to the seat frame.

10. The seatbelt presenter of claim 9 wherein the second end of the guide track (40) is received within the slotted opening (12A) in the front anchor (12) which is secured to the seat through a hole or opening (13).

* * * * *